United States Patent
Yamamoto et al.

(10) Patent No.: US 12,418,209 B2
(45) Date of Patent: Sep. 16, 2025

(54) MOTOR AND PUMP SYSTEM

(71) Applicant: NIDEC SANKYO CORPORATION, Nagano (JP)

(72) Inventors: Takashi Yamamoto, Nagano (JP); Takehiko Yazawa, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 27 days.

(21) Appl. No.: 18/536,251

(22) Filed: Dec. 12, 2023

(65) Prior Publication Data

US 2024/0106293 A1 Mar. 28, 2024

Related U.S. Application Data

(63) Continuation of application No. 17/561,630, filed on Dec. 23, 2021.

(30) Foreign Application Priority Data

Dec. 25, 2020 (JP) .................. 2020-216598

(51) Int. Cl.
*H02K 3/32* (2006.01)
*H02K 3/30* (2006.01)
*H02K 3/34* (2006.01)
*H02K 3/52* (2006.01)
*H02K 7/14* (2006.01)

(52) U.S. Cl.
CPC .............. *H02K 3/325* (2013.01); *H02K 3/30* (2013.01); *H02K 3/345* (2013.01); *H02K 3/522* (2013.01); *H02K 7/14* (2013.01)

(58) Field of Classification Search
CPC .......... H02K 11/33; H02K 3/30; H02K 3/325; H02K 3/345; H02K 3/522; H02K 5/08; H02K 5/10; H02K 7/14
See application file for complete search history.

(56) References Cited

U.S. PATENT DOCUMENTS

2011/0020154 A1* 1/2011 Matsuda ................ H02K 3/325
                                                                310/43
2017/0093252 A1* 3/2017 Otsubo .................... H02K 7/08
2017/0163118 A1* 6/2017 Kimpara ................ H02K 3/522

FOREIGN PATENT DOCUMENTS

JP        2004327277 A  * 11/2004
WO   WO-2019142289 A1 *  7/2019 ............. H02K 1/148

OTHER PUBLICATIONS

WO-2019142289-A1, all pages (Year: 2019).*
JP-2004327277-A, all pages (Year: 2004).*

* cited by examiner

Primary Examiner — Naishadh N Desai
(74) Attorney, Agent, or Firm — JCIPRNET

(57) ABSTRACT

In a motor, a wire terminal, to which an end at an end of winding of a wire is connected, is held by an insulator that is held by a stator core. The wire terminal comprises: a substrate connection section; plural legs held by a split insulator; a plate section, a thickness direction of which faces a radial direction, between the legs and the substrate connection section; and a wire connection section, a portion of which projected from the plate section is bent to hold the wire on an inner side. An elastic section is a meandering section meandering to turn back in a circumferential direction between the plate section and the substrate connection section, and extends from an end on another side in the circumferential direction of the plate section toward the substrate connection section.

17 Claims, 10 Drawing Sheets

MOTOR AND PUMP SYSTEM

CROSS REFERENCE TO RELATED APPLICATION

This application is a continuation application of and claims the priority benefit of a prior application Ser. No. 17/561,630, filed on Dec. 23, 2021. The prior application Ser. No. 17/561,630, filed on Dec. 23, 2021 claims priority under 35 U.S.C. § 119 to Japanese Application No. 2020-216598 filed Dec. 25, 2020. The entirety of the above-mentioned patent application is hereby incorporated by reference herein and made a part of this specification.

BACKGROUND

Field of the Invention

At least an embodiment of the present invention relates to a motor in which an end of a wire extending from a coil is connected to a wire terminal, and to a pump system.

Description of the Related Documents

For a motor having: a stator core in which plural salient poles are arranged in a circumferential direction with a motor axis being a center; an insulator that is held by the stator core; and a coil that is wound around the salient poles via the insulator, a structure of connecting an end of a wire that is drawn from the coil to a wire terminal is adopted (see Japanese Patent Application Publication No. 2017-103913). In the motor described in Japanese Patent Application Publication No. 2017-103913, the wire terminal has: a pin-shaped substrate connection section to which a substrate is connected; plural legs held by the insulator; a plate section that faces in a radial direction between the legs and the substrate connection section; and a wire connection section in which a portion projected from the plate section is bent to hold the wire on an inner side.

In the technique described in Japanese Patent Application Publication No. 2017-103913, the substrate connection section is in the pin shape that extends linearly. Thus, when the substrate connection section is inserted in a hole of the substrate to connect the substrate connection section and a land of the substrate by soldering, stress may be applied to the substrate, which damages a circuit. In addition, in the case where heat generated by the coil is transferred to the wire terminal to cause thermal expansion of the wire terminal at the time of driving the motor, the substrate may be bend, which damages the circuit. Furthermore, when the stator is resin-sealed, a portion of the wire terminal is also resin-sealed. Thus, when the wire terminal expands thermally due to the heat generated during resin-sealed, the substrate may be bent, which damages the circuit.

At least an embodiment of the present invention provides a motor and a pump system capable of suppressing transmission of stress from a wire terminal to a substrate.

SUMMARY

A motor according to at least an embodiment of the present invention includes: a stator core in which plural salient poles are arranged in a circumferential direction with a motor axis being a center; an insulator that is held by the stator core; a coil that is wound around the salient pole via the insulator; a wire terminal that is held by the insulator and to which a wire extending from the coil is connected; and a substrate that is connected to the wire terminal. The wire terminal has: a substrate connection section to which the substrate is connected; plural legs that are held by the insulator; a plate section, a thickness direction of which faces a radial direction, between the leg and the substrate connection section; an elastic section that is elastically deformable between the plate section and the substrate connection section; and a wire connection section in which a portion projected from the plate section is bent to hold the wire on an inner side.

In at least an embodiment of the present invention, since the elastic section is provided between the substrate connection section and the leg of the wire terminal, it is possible to absorb stress by the elastic section. Accordingly, it is possible to suppress transmission of the stress from the wire terminal to the substrate by the elastic section.

At least an embodiment of the present invention can adopt such an aspect that the stator core, the insulator, the coil, and a portion of the wire terminal from the leg to the wire connection section are covered with a resin-sealed member. Even when such an aspect is adopted, stress generated by thermal expansion of the wire terminal is absorbed by the elastic section. Therefore, it is possible to suppress the transmission of the stress to the substrate.

At least an embodiment of the present invention can adopt such an aspect that an end of the plate section on the side of the elastic section is exposed from the resin-sealed member. According to such an aspect, it is possible to suppress the elastic section from being covered with the resin-sealed member.

At least an embodiment of the present invention can adopt such an aspect that the plural legs include: a first leg that is projected, on one side in the circumferential direction of the wire connection section, from the plate section toward the insulator; and a second leg that is projected, on another side in the circumferential direction of the wire connection section, from the plate section toward the insulator, that the insulator is provided with a first hole into which the first leg is fitted and a second hole into which the second leg is fitted, that the first hole is a press-fitting hole into which the first leg is fitted, and that the second hole is a guide hole into which the second leg is fitted. According to such an aspect, since the second hole into which the other leg of the two legs is fitted is a guiding hole, it is easier to attach a common terminal to the insulator than a case where both of the first and second legs are press-fitted.

At least an embodiment of the present invention can adopt such an aspect that each of the first leg and the second leg is a square bar in a rectangular cross section, the first hole is a round hole in a circular cross section, and the second hole is a square hole in a rectangular cross section.

At least an embodiment of the present invention can adopt such an aspect that the second leg is longer than the first leg. According to such an aspect, since the second leg that is fitted into the guiding second hole is long, the common terminal can easily be guided. Therefore, the common terminal can easily be attached to the insulator.

At least an embodiment of the present invention can adopt such an aspect that the elastic section is a meandering section that meanders between the plate section and the substrate connection section, and, when seen in a direction of the motor axis, the meandering section does not overlap the first leg. According to such an aspect, when the end of the plate section on an opposite side of the insulator is pressed to press-fit the first leg into the first hole, the meandering section is unlikely to interfere with press-fitting.

At least an embodiment of the present invention can adopt such an aspect that, when seen in the direction of the motor axis, the elastic section meanders within a range that overlaps the plate section in the circumferential direction.

At least an embodiment of the present invention can adopt such an aspect that the elastic section has a pin shape that has a longer length dimension than the first leg and extends linearly toward the substrate connection section.

At least an embodiment of the present invention can adopt such an aspect that the elastic section extends from an end of the plate section on the other side in the circumferential direction toward the substrate connection section.

At least an embodiment of the present invention can adopt such an aspect that the wire connection section is electrically connected to the wire by fusing work.

The motor according to at least an embodiment of the present invention can be used in a pump system. In this case, the pump system is provided with an impeller that is rotationally driven by the motor.

In at least an embodiment of the present invention, since the elastic section is provided between the substrate connection section and the leg of the wire terminal, it is possible to absorb the stress by the elastic section. Therefore, it is possible to suppress the transmission of the stress from the wire terminal to the substrate by the elastic section.

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which.

DETAILED DESCRIPTION

A description will hereinafter be made on a motor and a pump system according to an embodiment of the present invention with reference to the drawings. In the following description, a motor axis L direction means a direction in which a motor axis L extends, a radial direction on an inner side in the radial direction and an outer side in the radial direction means a radial direction with the motor axis L being a center, and a circumferential direction means a rotational direction with the motor axis L being a center.

Overall Configuration

Figure 1:
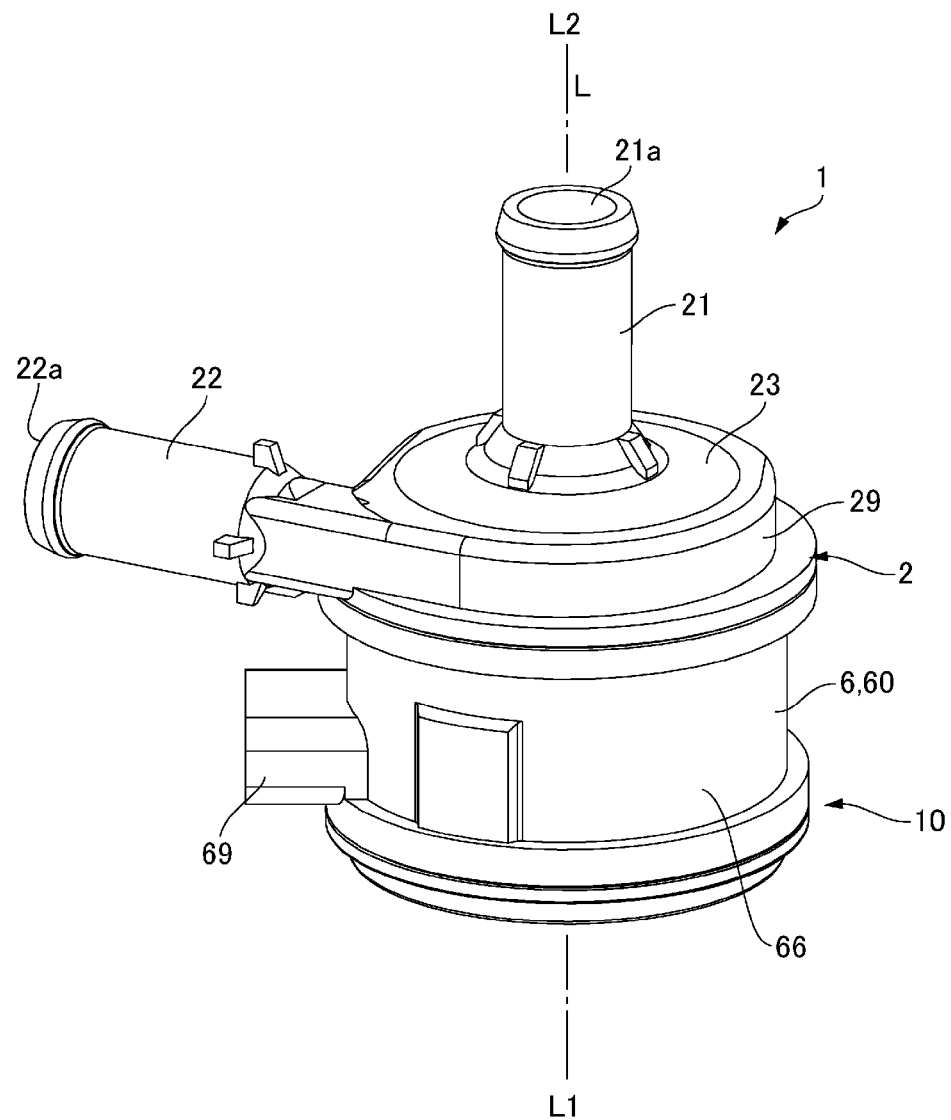
FIG. 1 is a perspective view illustrating an aspect of a pump system and a motor to which at least an embodiment of the present invention is applied.
Figure 2:
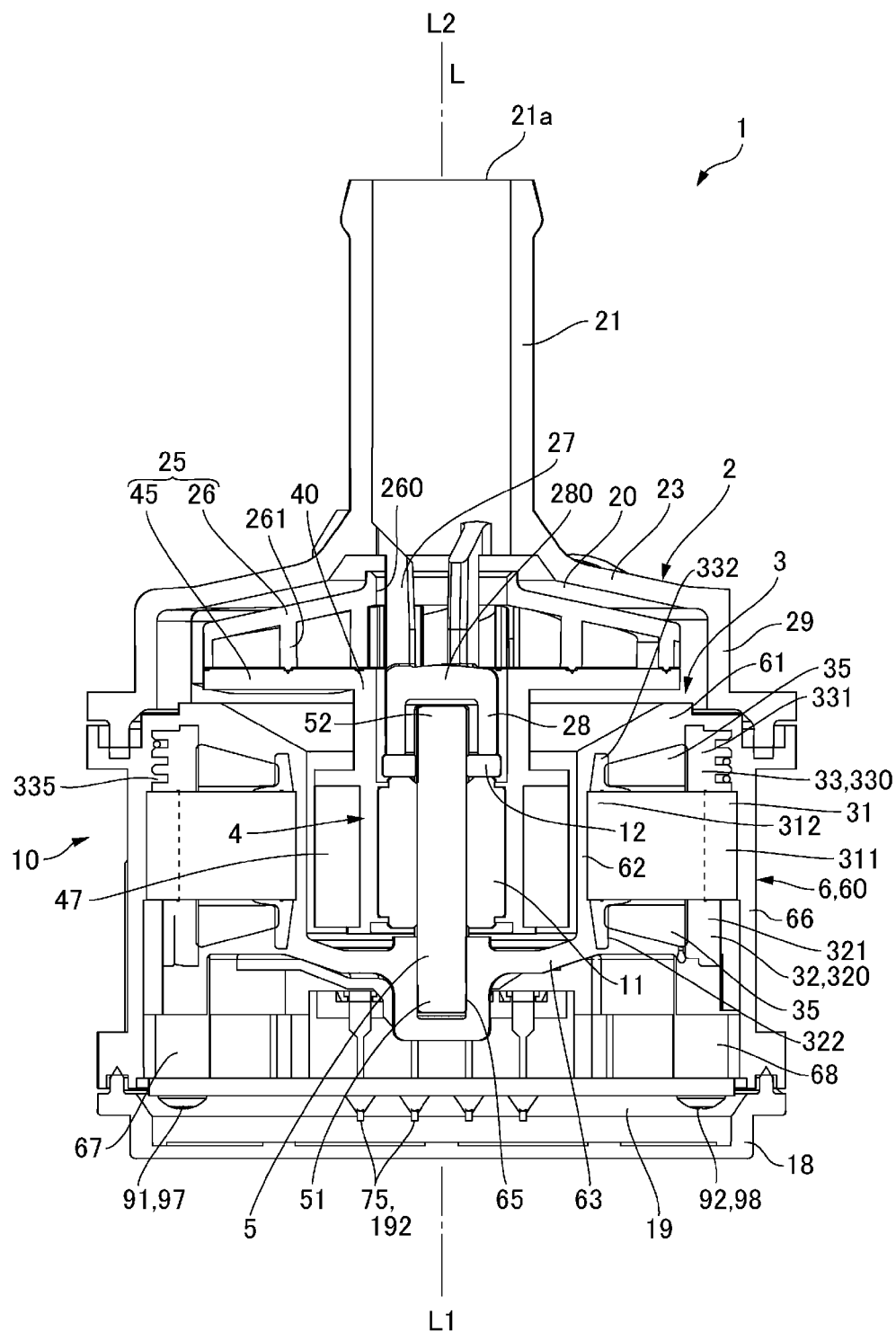
FIG. 2 is a vertical cross-sectional view of the pump system and the motor illustrated in FIG. 1.

FIG. 1 is a perspective view illustrating an aspect of a pump system 1 and a motor 10 to which at least an embodiment of the present invention is applied. FIG. 2 is a vertical cross-sectional view of the pump system 1 and the motor 10 illustrated in FIG. 1. In FIG. 1 and FIG. 2, the pump system 1 has: a case 2 that includes a suction port 21a and a discharge port 22a; the motor 10 that is arranged on one side L1 in the motor axis L direction of the case 2; and an impeller 25 that is arranged in a pump chamber 20 inside the case 2. The impeller 25 is rotationally driven around the motor axis L by the motor 10. The motor 10 includes: a cylindrical stator 3; a rotor 4 that is arranged in the stator 3; a housing 6 that is made of resin and covers the stator 3; and a support shaft 5 that has a round rod shape and supports the rotor 4 in a manner to allow rotation thereof. The support shaft 5 is made of metal or ceramic. In the pump system 1 of this form, a fluid is a liquid, and the pump system 1 is used under such a condition that an environmental temperature and a fluid temperature are likely to change.

The case 2 constitutes a wall surface 23 on another side L2 in the motor axis L direction of the pump chamber 20 and a side wall 29 that extends in the circumferential direction. The case 2 includes: a suction pipe 21 that extends along the motor axis L; and a discharge pipe 22 that extends in a direction orthogonal to the motor axis L. Each of the suction pipe 21 and the discharge pipe 22 has the suction port 21a and the discharge port 22a at an end. The suction pipe 21 is concentrically provided to the motor axis L.

In the motor 10, the stator 3 has: a stator core 31; insulators 32, 33 that are held by the stator core 31; and a coil 35 that is wound on the stator core 31 via the insulators 32, 33.

The rotor 4 includes a cylindrical section 40 that extends from a position on an inner side in the radial direction opposing the stator 3 toward the pump chamber 20 along the motor axis L, and the cylindrical section 40 is opened in the pump chamber 20. A cylindrical magnet 47 is held on an outer circumferential surface of the cylindrical section 40 in a manner to oppose the stator 3 at the position on the inner side in the inner radial direction thereof. The magnet 47 is a neodymium bonded magnet, for example.

In the rotor 4, a disc-shaped flange section 45 is formed at an end of the other side L2 in the motor axis L direction of the cylindrical section 40, and a disc 26 is coupled to the flange section 45 from the other side L2 in the motor axis L direction. A central hole 260 is formed at a center of the disc 26. Plural vane sections 261, each of which extends outward in the radial direction while being curved arcuately around the central hole 260 are formed at equal angular intervals on a surface of the disc 26 opposing the flange section 45, and the disc 26 is fixed to the flange section 45 via the vane sections 261. Accordingly, the flange section 45 and the disc 26 constitute the impeller 25 that is connected to the cylindrical section 40 of the rotor 4. In this embodiment, the disc 26 is inclined such that a portion thereof on the outer side in the radial direction is located on the flange section 45 side from the inner side in the radial direction.

In the rotor 4, a cylindrical radial bearing 11 is held on the inner side in the radial direction of the cylindrical section 40 by a method such as caulking, and the rotor 4 is rotatably supported on the support shaft 5 via the radial bearing 11. A first end 51 on the one side L1 in the motor axis L direction of the support shaft 5 is held in a shaft hole 65 that is formed in a bottom wall 63 of the housing 6. The case 2 is formed with a receiving section 280 that opposes, on the pump chamber 20 side, a second end 52 on the pump chamber 20 side of the support shaft 5 and limits a movable range of the support shaft 5 to the pump chamber 20 side. The case 2 includes three support sections 27, each of which extends from an inner circumferential surface of the suction pipe 21 to the motor 10 side. A cylindrical section 28, in which the support shaft 5 is located, is formed at an end of the support section 27, and the receiving section 280 is constructed of a bottom section on the other side L2 in the motor axis L direction of the cylindrical section 28. A circular thrust bearing 12 is mounted on the second end 52 of the support shaft 5. The thrust bearing 12 is arranged between the radial bearing 11 and the cylindrical section 28. Here, the first end 51 and the shaft hole 65 are at least partially formed to have a D-shaped cross section, and the second end 52 of the support shaft 5 and a hole of the thrust bearing 12 are formed to have a D-shaped cross section. In this way, rotation of the support shaft 5 and the thrust bearing 12 is inhibited.

The housing 6 is a partition wall member having: a first partition wall section 61 that opposes the wall surface 23 of the pump chamber 20; and a second partition wall section 62 that is interposed between the stator 3 and the magnet 47. The housing 6 also has a cylindrical trunk section 66 that covers the stator 3 from the outer side in the radial direction. Accordingly, the housing 6 is a resin-sealed member 60 that covers the stator 3 from both sides in the radial direction and from both sides in the motor axis L direction, and is a resin portion at the time of insertion molding of the stator 3 by polyphenylene sulfide (PPS) or the like.

Detailed Configuration of Motor 10

Figure 3:
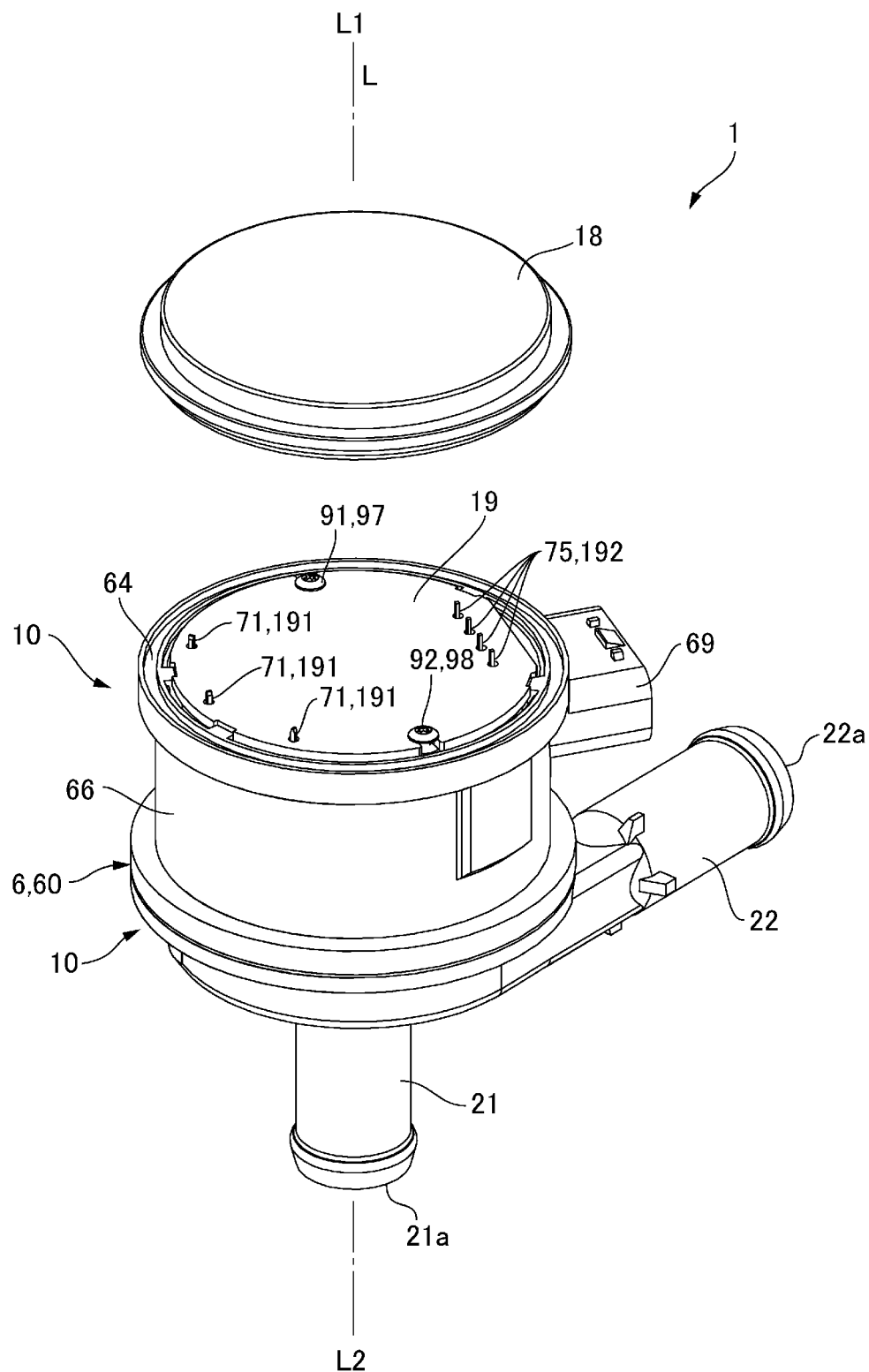
FIG. 3 is an exploded perspective view illustrating a state where a cover is removed from the pump system illustrated in FIG. 1.
Figure 4:
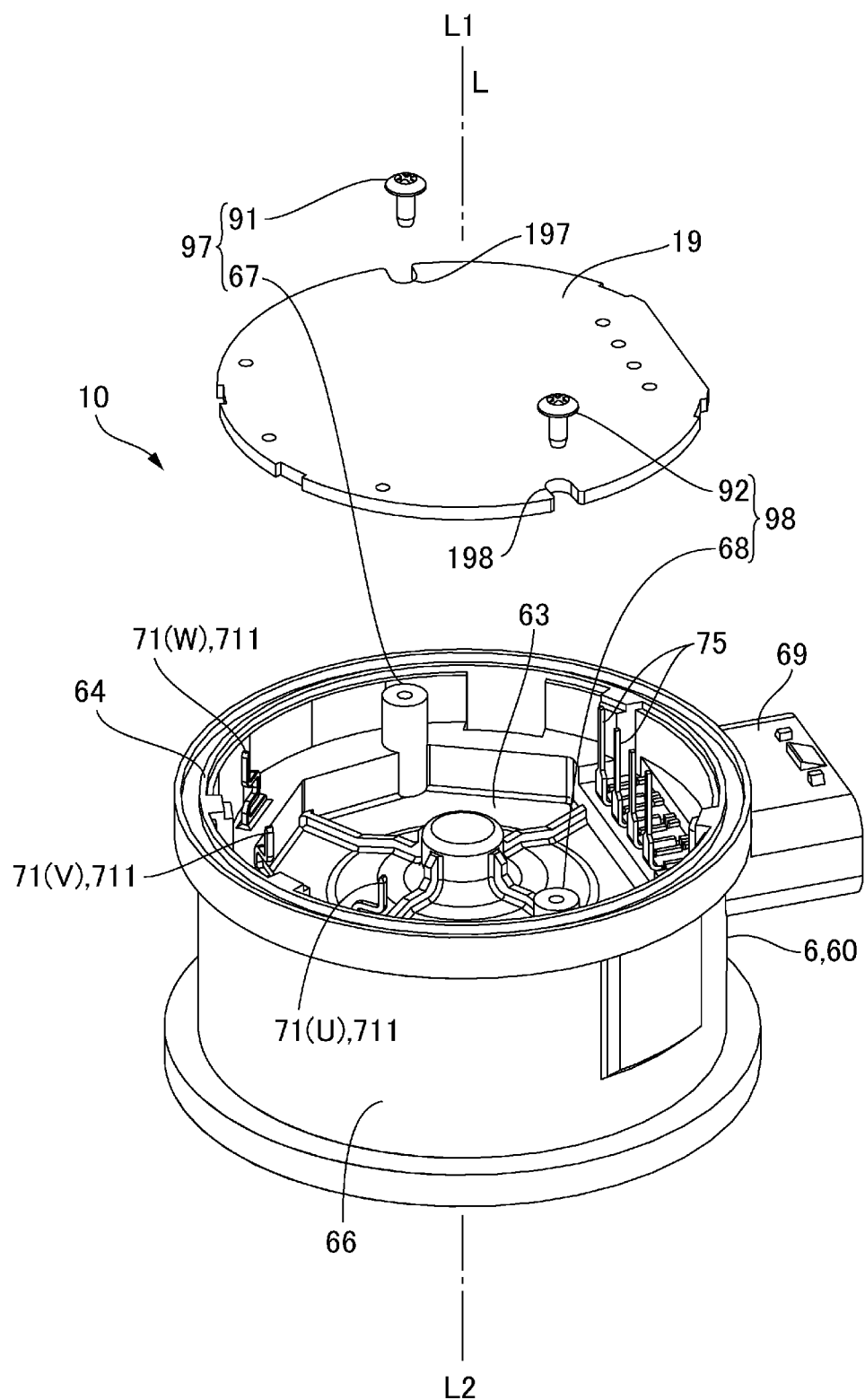
FIG. 4 is an exploded perspective view illustrating a state where a substrate is removed from the state illustrated in FIG. 3.
Figure 5:
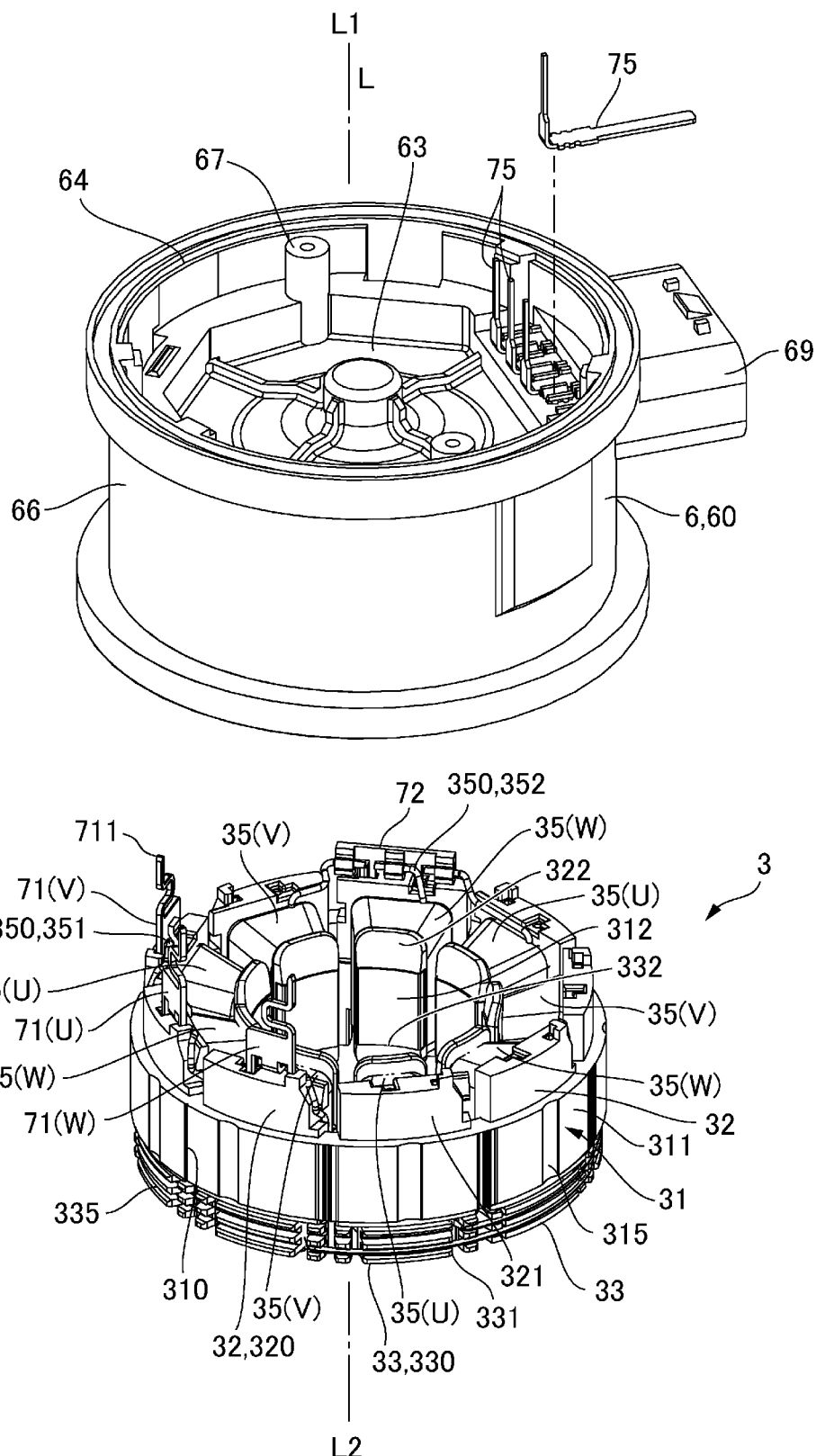
FIG. 5 is an exploded perspective view illustrating a state where a housing and a stator are separated from each other in the motor illustrated in FIG. 1.

FIG. 3 is an exploded perspective view illustrating a state where the cover 18 is removed from the pump system 1 illustrated in FIG. 1. FIG. 4 is an exploded perspective view illustrating a state where a substrate 19 is removed from the state illustrated in FIG. 3. FIG. 5 is an exploded perspective view illustrating a state where the housing 6 and the stator 3 are separated from each other in the motor 10 illustrated in FIG. 1. In FIG. 3, FIG. 4, and FIG. 5, the motor axis L direction is reversed vertically from that in FIG. 1 and FIG. 2, and the one side L1 in the motor axis L direction is set on an upper side in the drawings.

As illustrated in FIG. 2, FIG. 3, and FIG. 4, the cover 18 is fixed to an end 64 on the one side L1 in the motor axis L direction of the housing 6 from the one side L1 in the motor axis L direction, and the substrate 19 that is provided with a circuit controlling power supply to the coil 35, and the like is arranged between the cover 18 and the bottom wall 63 of the housing 6.

The substrate 19 is fixed to the housing 6 by a first fixing section 97 using a first screw 91 and a second fixing section 98 using a second screw 92. The housing 6 is formed with a first cylindrical section 67 that is projected from the bottom wall 63 toward the one side L1 in the motor axis L direction. The first fixing section 97 is constituted by fastening the first screw 91, which is constructed of a tapping screw, to the first cylindrical section 67 via a notch 197 that is formed at an edge of the substrate 19. The housing 6 is formed with a second cylindrical section 68 that is projected from the bottom wall 63 on an opposite side with the motor axis L being the center toward the one side L1 in the motor axis L direction. The second fixing section 98 is constituted by fastening the second screw 92, which is constructed of a tapping screw, to the second cylindrical section 68 via a notch 198 that is formed at the edge of the substrate 19.

The substrate 19 is provided with: plural first connection sections 191, to each of which a metal wire terminal 71 that passes through the bottom wall 63 of the housing 6 from the stator 3 and is projected to the one side L1 in the motor axis L direction is connected by soldering; and a second connection section 192, to which a metal connector terminal 75 that is held by the housing 6 is connected by soldering. The substrate 19 is formed with a wire that electrically connects the second connection section 192 and each of the first connection sections 191 via a drive circuit and the like mounted on the substrate 19, and the like.

A cylindrical connector housing 69 is formed in the housing 6, and an end of the connector terminal 75 is located in the connector housing 69. Accordingly, when a connector is connected to the connector housing 69 and a signal or the like is supplied thereto, such a signal is input to the drive circuit via the connector terminal 75 and the second connection section 192. As a result, a drive current that is generated by the drive circuit is supplied to each of the coils 35 via the first connection section 191 and the wire terminal 71. Consequently, the rotor 4 rotates about the motor axis L. In this way, the impeller 25 rotates in the pump chamber 20 and a negative pressure is generated in the pump chamber 20. Thus, the fluid is suctioned into the pump chamber 20 from the suction pipe 21 and is discharged from the discharge pipe 22.

As illustrated in FIG. 2 and FIG. 5, in the stator 3, the stator core 31 includes: a circular section 311 that extends in a circular shape; and plural salient poles 312, each of which is projected inward in the radial direction from the circular section 311. The salient poles 312 are arranged at a constant pitch in the circumferential direction. The stator core 31 is a laminated core that is formed by laminating thin magnetic plates, each of which is made of a magnetic material. A recessed section 315 that extends in the motor axis L direction is formed on an outer circumferential surface of the circular section 311 in a manner to correspond to the plural salient poles 312. In this embodiment, the stator core 31 is formed by bending a linearly extending member into a circular shape and then welding ends of the circular section 311 together. Accordingly, the stator core 31 includes a weld section 310 that connects circumferentially extending portions of the circular section 311 at one position in the circumferential direction.

The insulators 32, 33 overlap the stator core 31 from both sides in the motor axis L direction and cover each of the plural salient poles 312. In this embodiment, the insulators 32, 33 respectively include plural split insulators 320, 330, each of which is split in a manner to correspond to respective one of the plural salient poles 312. The plural split insulators 320, 330 respectively include: outer circumferential portions 321, 331, each of which overlaps the circular section 311 of the stator core 31 in the motor axis L direction; inner circumferential portions 322, 332, each of which is projected in the motor axis L direction at a radially inner end of the salient pole 312; and a cylinder forming portion (not illustrated) that respectively connects the outer circumferential portions 321, 331 and the inner circumferential portions 322, 332. The coil 35 is wound around the salient poles 312 via the cylinder forming portion.

The motor 10 is a three-phase motor. Accordingly, in the plural coils 35, a first phase coil 35(U) including a U-phase coil, a second phase coil 35(V) including a V-phase coil, and a third phase coil 35(W) including a W-phase coil are arranged in this order. In this embodiment, three each of the first phase coils 35(U), the second phase coils 35(V), and the third phase coils 35(W) are arranged, and the total number of the coils 35 is nine. Accordingly, a total of the nine split insulators 320 is arranged, and the nine split insulators 320 have the same configuration.

In this embodiment, a guide groove 335 for the wire 350 at the time of winding the coil 35 is formed on an outer surface of the outer circumferential portion 321 in each of the nine split insulators 330, and the first phase coil 35(U) is formed of a single wire. Accordingly, the three first phase coils 35(U) are electrically connected in series. The same applies to the second phase coil 35(V) and the third phase coil 35(W).

In addition, each of the wire terminals 71 is held by the outer circumferential portion 321 of respective one of the split insulator 320 that corresponds to one of the first phase coils 35(U), the split insulator 320 that corresponds to one of the second phase coils 35(V), and the split insulator 320 that corresponds to one of the third phase coils 35(W) of the nine split insulators 320. One end 351 of the wire 350 that constitutes each of the three coils 35 connected in series is connected to each of the three wire terminals 71, and another end 352 is electrically connected to a metal common terminal 72 that is held by the outer circumferential portion 321 of the other split insulator 320. In this embodiment, the other end 352 is an end at the beginning of winding, and the one end 351 is an end at the end of winding.

The wire terminal 71 is projected from the split insulator 320 toward the one side L1 in the motor axis L direction, and a substrate connection section 711 as a tip of the wire terminal 71 is connected to the substrate 19 illustrated in FIG. 2, FIG. 3, and FIG. 4.

Configuration of Wire Terminal 71

Figure 6:
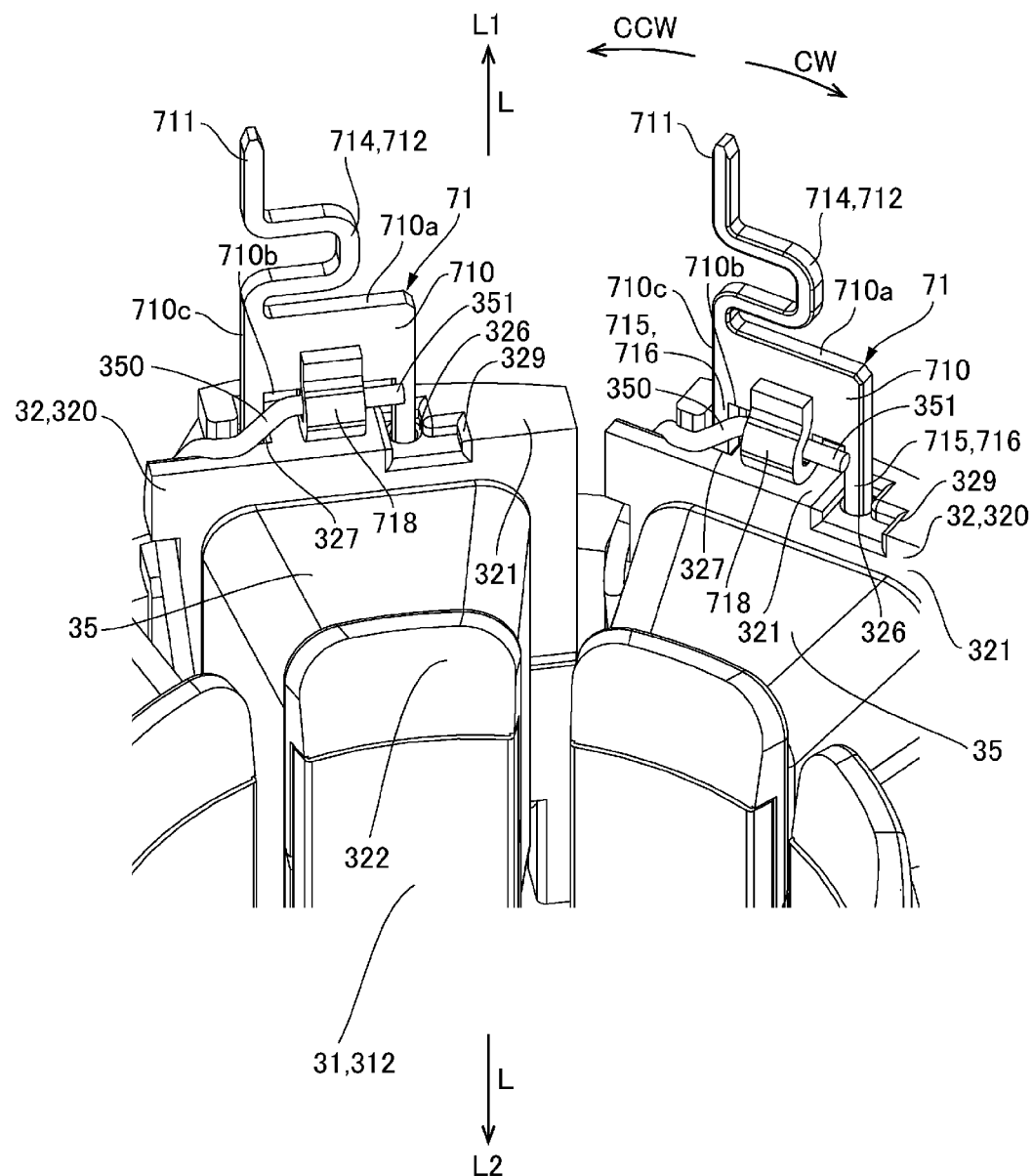
FIG. 6 is a perspective view in which a portion around a wire terminal illustrated in FIG. 5 is seen from an inner side in a radial direction.
Figure 7:
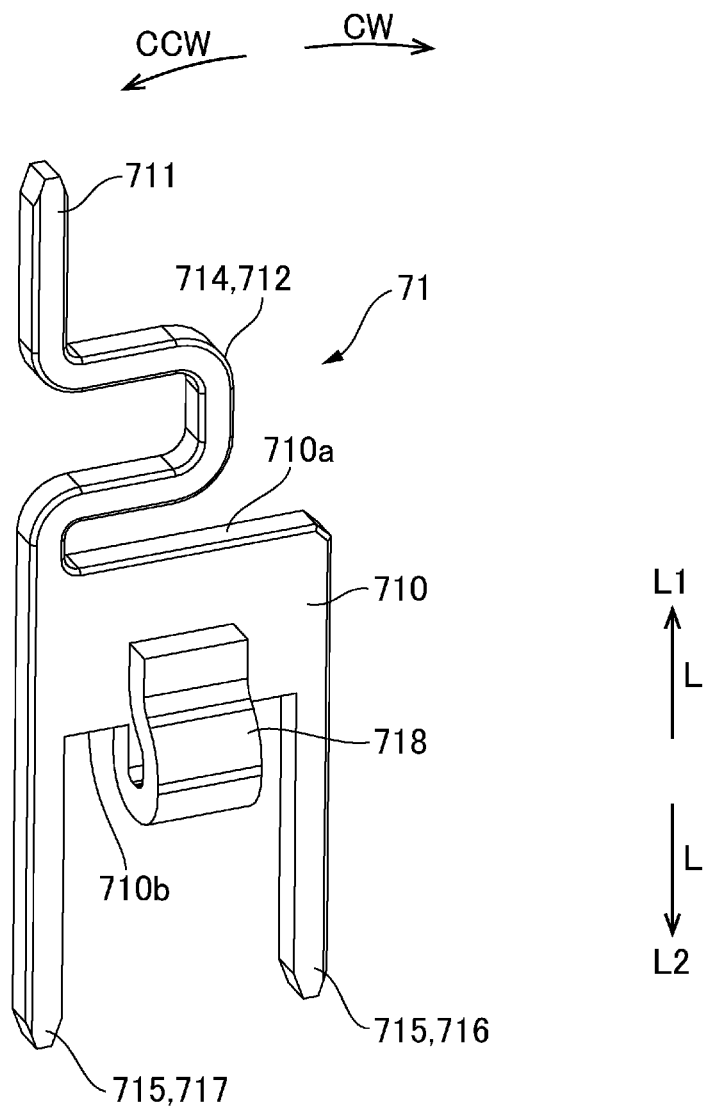
FIG. 7 is a perspective view in which the wire terminal illustrated in FIG. 5 is seen from the inner side in the radial direction.

FIG. 6 is a perspective view in which a portion around the wire terminal 71 illustrated in FIG. 5 is seen from the inner side in the radial direction. FIG. 7 is a perspective view in which the wire terminal 71 illustrated in FIG. 5 is seen from the inner side in the radial direction. Similar to FIG. 3 and the like, also in FIG. 6 and FIG. 7, the one side L1 in the motor axis L direction is set as an upper side.

As illustrated in FIG. 5, the wire terminal 71, to which the winding end 351 of the wire 350 extending from the coil 35, is held by each of the three split insulators 320 with different corresponding phases among the split insulators 320 not provided with the common terminal 72.

As illustrated in FIG. 6 and FIG. 7, the wire terminal 71 has: the substrate connection section 711; plural legs 715 held by the split insulator 320; a plate section 710, a thickness direction of which faces the radial direction, between the legs 715 and the substrate connection section 711; and a wire connection section 718, a portion of which projected from the plate section 710 is bent to hold the wire 350 on an inner side. The wire connection section 718 has a portion that is projected from an end 710a on the leg 715 side of the plate section 710 and is bent upward so as to hold the wire 350 on the inner side. Accordingly, the wire connection section 718 holds the end 351 of the wire 350 by fusing work and is electrically connected to the end 351 of the wire 350. The fusing work is thermal caulking processing that connects the wire 350 and the wire connection section 718 by using electrical resistance.

In this embodiment, the wire terminal 71 has an elastic section 714 that is elastically deformable between the plate section 710 and the substrate connection section 711. Here, as illustrated in FIG. 4, the stator core 31, the insulator 32, the coil 35, and a portion of the wire terminal 71 from the leg 715 to the wire connection section 718 are covered with a resin-sealed member 60. However, the substrate connection section 711 and the elastic section 714 are projected from the bottom wall 63 of the resin-sealed member 60 to the one side L1 in the motor axis L direction and are exposed. More specifically, a large portion of the plate section 710 is covered with the resin-sealed member 60. However, an end 710b on the elastic section 714 side of the plate section 710 is exposed from the bottom wall 63 of the resin-sealed member 60. Accordingly, the substrate connection section 711 and the elastic section 714 are projected from the bottom wall 63 of the resin-sealed member 60 to the one side L1 in the motor axis L direction and are exposed.

In this embodiment, of the two legs 715, one of the legs 715 is a first leg 716, and the other leg 715 is a second leg 717 that is provided on another side CCW in the circumferential direction of the first leg 716. Corresponding to such a configuration, the split insulator 320 is provided with: a first hole 326 into which the first leg 716 is fitted; and a second hole 327 into which the second leg 717 is fitted on the other side CCW in the circumferential direction of the first leg 716.

In this embodiment, the first hole 326 is a press-fitting hole into which the first leg 716 is fitted, and the second hole 327 is a guide hole into which the second leg 717 is fitted. Here, each of the two legs 715 is a square bar in a rectangular cross section and has an equal thickness. However, the first hole 326 is a round hole in a circular cross section, and the second hole 327 is a square hole in a rectangular cross section. Accordingly, the second hole 327 can constitute the guide hole, and the first hole 326 can constitute the press-fitting hole. Here, the first hole 326 is opened at a bottom of a recessed section 329 that is formed by cutting out a surface on the one side L1 in the motor axis L direction of the split insulator 320 and a radially inner surface.

In this embodiment, the elastic section 714 is a meandering section 712 that meanders to turn back in the circumferential direction at a position between the plate section 710 and the substrate connection section 711. Here, the elastic section 714 extends from an end 710c on the other side CCW in the circumferential direction of the plate section 710 toward the substrate connection section 711. When seen in the motor axis L direction, the meandering section 712 does not overlap the first leg 716 that is used to press-fit. Accordingly, when the end 710a of the plate section 710 on the opposite side of the split insulator 320 is pressed to press-fit the first leg 716 into the first hole 326, the meandering section 712 is unlikely to interfere with press-fitting. In addition, when seen in the motor axis L direction, the elastic section 714 meanders within a range that overlaps the plate section 710 in the circumferential direction and does not bulge from the plate section 710 in the circumferential direction. Thus, it is possible to reduce a circumferential dimension of the wire terminal 71.

As described above, in this embodiment, since the elastic section 714 is provided between the substrate connection section 711 and the leg 715 of the wire terminal 71, it is possible to absorb stress by the elastic section 714. Accordingly, it is possible to suppress transmission of the stress from the wire terminal 71 to the substrate 19 by the elastic section 714. For example, it is possible to suppress the stress from being applied to the substrate 19 and damaging the circuit at the time when the substrate connection section 711 is inserted in the hole of the substrate 19 and the substrate connection section 711 is connected to the land of the substrate 19 by soldering. In addition, also in the case where heat generated by the coil 35 is transferred to the wire terminal 71 to cause thermal expansion of the wire terminal 71 at the time of driving the motor 10, it is possible to suppress the substrate 19 from being bent, which damages the circuit. Furthermore, when the stator 3 is resin-sealed, a portion of the wire terminal 71 is also resin-sealed. Thus, even when the wire terminal 71 expands thermally due to the heat generated during resin-sealed, it is possible to suppress the substrate 19 from being bent, which damages the circuit.

Configuration of Common Terminal 72

Figure 8:
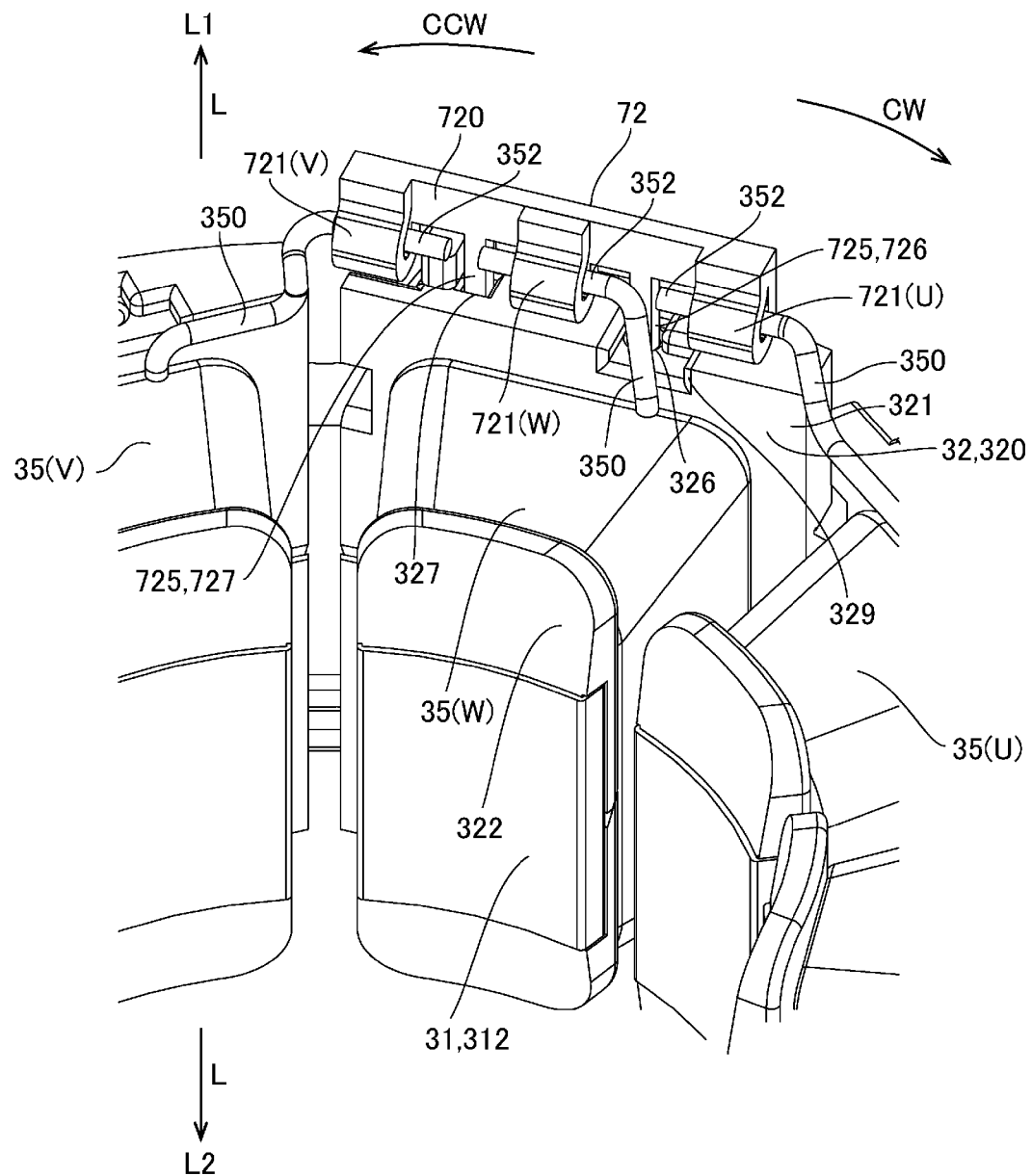
FIG. 8 is a perspective view in which a portion around a common terminal illustrated in FIG. 5 is seen from the inner side in the radial direction.

FIG. 8 is a perspective view in which a portion around the wire common terminal 72 illustrated in FIG. 5 is seen from the inner side in the radial direction. Similar to FIG. 3 and the like, also in FIG. 8, the one side L1 in the motor axis L direction is set as the upper side.

As illustrated in FIG. 5, a common terminal 72, to which the ends 352 at the beginning of winding of the wires 350 in the number corresponding to the number of the phases of the coils 35 are connected, is held by the split insulator 320(W) of the split insulators 320 not provided with the wire terminal 71.

In this embodiment, the common terminal 72 includes: a plate section 720 that extends in the circumferential direction; plural wire connection sections 721 in which portions projected from plural positions in the circumferential direction of the plate section 720 are each bent to hold the end 352 of the wire 350 on the inner side; and a leg 725 that is projected from the plate section 720 toward the split insulator 320 at a position between one adjacent pair of the wire connection sections 721 among the plural wire connection sections 721. The leg 725 is held by the split insulator 320. The leg 725 is provided only between the adjacent wire connection sections 721 of the plural wire connection sections 721. Accordingly, since the number of the legs 725 is small, the plate section 720 has a short circumferential dimension. Thus, the plate section 720 is formed in a flat plate shape that extends linearly along the circumferential direction.

In addition, the plural wire connection sections 721 are each bent to hold the end 352 of the wire 350 on the inner side, and each of the wire connection sections 721 holds the end 352 of the wire 350 by the fusing work and is electrically connected to the end 352 of the wire 350.

In this embodiment, since the number of the phases is three, the three wire connection sections 721 are provided, and the two legs 725 are provided. Of the two legs 725, one of the legs 725 is a first leg 726, and the other leg 725 is a second leg 727 that is provided on the other side CCW in the circumferential direction of the first leg 726. Corresponding to such a configuration, similar to the split insulator 320 that holds the wire terminal 71, the split insulator 320 is provided with: the first hole 326 into which the first leg 726 is fitted; and the second hole 327 into which the second leg 727 is fitted on the other side CCW in the circumferential direction of the first leg 726.

In this embodiment, the first hole 326 is the press-fitting hole into which the first leg 726 is fitted, and the second hole 327 is the guide hole into which the second leg 727 is fitted. Here, each of the two legs 725 is the square bar in the rectangular cross section and has the equal thickness. However, the first hole 326 is the round hole in the circular cross section, and the second hole 327 is the square hole in the rectangular cross section. Accordingly, the second hole 327 can constitute the guide hole, and the first hole 326 can constitute the press-fitting hole.

The three wire connection sections 721 include: a first wire connection section 721(U); a second wire connection section 721(V) that is provided on the other side CCW in the circumferential direction of the first wire connection section 721(U); and a third wire connection section 721(W) that is provided between the first wire connection section 721(U) and the second wire connection section 721(V). The end 352 of the wire 350 that extends from the first phase coil 35(U) reaches the first wire connection section 721(U) from one side CW in the circumferential direction. The end 352 of the wire 350 that extends from the second phase coil 35(V) reaches the second wire connection section 721(V) from the other side CCW in the circumferential direction. The end 352 of the wire 350 that extends from the third phase coil 35(W) reaches the third wire connection section 721(W) from the one side CW in the circumferential direction. Here, the split insulator 320 is provided with a guiding recessed section 329 between the first wire connection section 721(U) and the third wire connection section 721(W), and the guiding recessed section 329 guides the end 352 of the wire 350, which extends from the third phase coil 35(W), to the third wire connection section 721(W) to the inner side in the radial direction. Accordingly, even in the case where each of the end 352 of the wire 350 extending from the first phase coil 35(U) and the end 352 of the wire 350 extending from the third phase coil 35(W) reaches from the one side CW in the circumferential direction, the end 352 of the wire 350 extending from the third phase coil 35(W) can be guided to the third wire connection section 721(W) through the guiding recessed section 329, and thus can easily be connected to the common terminal 72.

As described above, in the motor 10 and the pump system 1 of this embodiment, the common terminal 72 is provided with the single leg 725 between one pair of the adjacent wire connection sections 721. The leg 725 is provided only between the adjacent wire connection sections 721 of the plural wire connection sections 721, and the leg 725 is not provided between both ends of the plate section 720. Accordingly, since the common terminal 72 has a short circumferential dimension, it is possible to reduce cost of the common terminal 72. In addition, since the number of the legs 725 is small, the common terminal 72 can easily be attached to the insulator 32.

Since the circumferential dimension of the common terminal 72 is short, it is possible to realize a structure of holding the common terminal 72 by the single split insulator 320. Thus, relative positional accuracy between the first hole 326 and the second hole 327, into which the leg 725 is fitted, is high. Therefore, the common terminal 72 can easily be attached. In addition, since the circumferential dimension of the common terminal 72 is short, the plate section 720 of the common terminal 72 can have the flat plate shape, and a process of curving the plate section 720 is unnecessary. Therefore, the cost of the common terminal 72 can be reduced.

In the insulator 32, the first hole 326 is the press-fitting hole into which the first leg 726 is fitted, and the second hole 327 is the guide hole into which the second leg 727 is fitted. Accordingly, the first leg 726 can be press-fitted into the first hole 326 while the second leg 727 and the second hole 327 guide the common terminal 72. Thus, compared to a case where both of the two legs are press-fitted, the common terminal 72 can easily be attached to the insulator 32.

First Modified Embodiment of Wire Terminal 71

Figure 9:
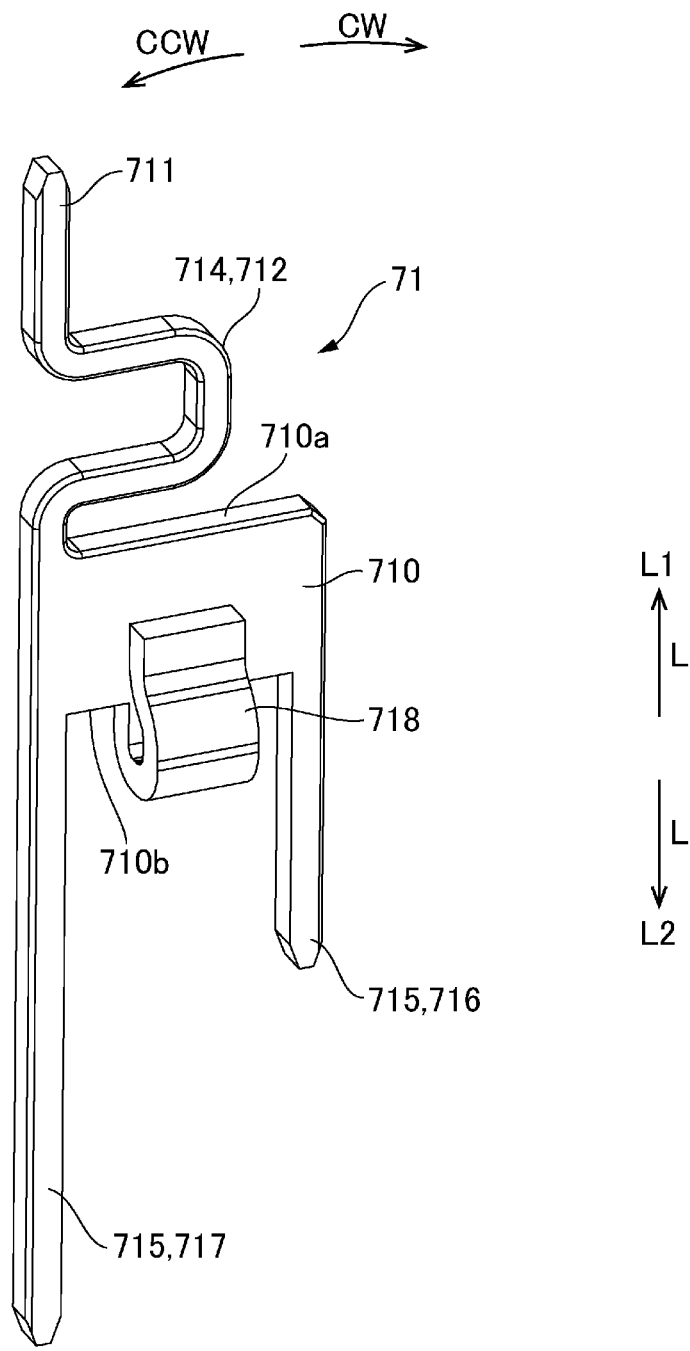
FIG. 9 is a perspective view in which a first modified embodiment of the wire terminal illustrated in FIG. 7 is seen from the inner side in the radial direction.

FIG. 9 is a perspective view in which a first modified embodiment of the wire terminal 71 illustrated in FIG. 7 is seen from the inner side in the radial direction. Since a basic configuration in this modified embodiment is similar to that in the above embodiment, common portions will be denoted by the same reference numerals, and a description thereon will not be made.

In the wire terminal 71 that has been described with reference to FIG. 7 and the like, the first leg 716 and the second leg 717 have the equal length. However, in this modified embodiment, as illustrated in FIG. 9, the guiding second leg 717 is longer than the press-fitting first leg 716. Accordingly, the common terminal 72 can easily be guided when the first leg 716 is press-fitted into the first hole 326 while the second leg 717 and the second hole 327 guide the wire terminal 71.

Second Modified Embodiment of Wire Terminal 71

Figure 10:
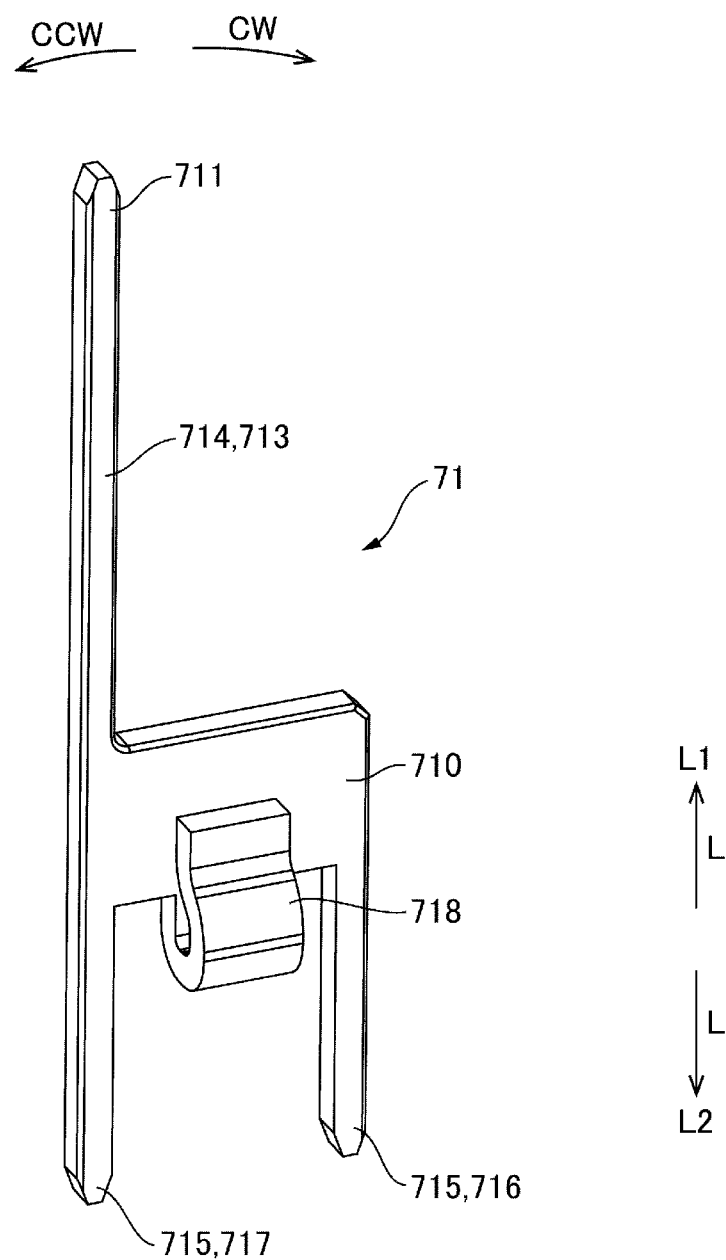
FIG. 10 is a perspective view in which a second modified embodiment of the wire terminal illustrated in FIG. 7 is seen from the inner side in the radial direction.

FIG. 10 is a perspective view in which a second modified embodiment of the wire terminal 71 illustrated in FIG. 7 is seen from the inner side in the radial direction. Since a basic configuration in this modified embodiment is similar to that in the above embodiment, common portions will be denoted by the same reference numerals, and a description thereon will not be made.

In the wire terminal 71 that has been described with reference to FIG. 7 and the like, the elastic section 714 is the meandering section 712. However, in this modified embodiment, as illustrated in FIG. 10, the elastic section 714 is a pin-shaped shaft section 713 that has a longer dimension than the first leg 716 and extends linearly toward the substrate connection section 711. For example, the shaft section 713 that constitutes the elastic section 714 is 1.2 to 1.5 times longer than the first leg 716. Accordingly, the elastic section 714 has appropriate elasticity.

Here, the elastic section 714 extends from the end 710c on the other side CCW in the circumferential direction of the plate section 710 toward the substrate connection section 711. When seen in the motor axis L direction, the elastic section 714 does not overlap the first leg 716 that is used to press-fit. Accordingly, when the end 710a of the plate section 710 on the opposite side of the split insulator 320 is pressed to press-fit the first leg 716 into the first hole 326, the elastic section 714 is unlikely to interfere with press-fitting.

OTHER EMBODIMENTS

The motor 10 that is used in the pump system 1 has been exemplified in the above embodiment. However, at least an embodiment of the present invention may be applied to a motor that is mounted on another equipment.

What is claimed is:

1. A motor comprising:
a stator core in which plural salient poles are arranged in a circumferential direction with a motor axis being a center;
an insulator that is held by the stator core;
a coil that is wound around the salient pole via the insulator;
a wire terminal that is held by the insulator and to which a wire extending from the coil is connected; and
a substrate that is connected to the wire terminal, wherein the wire terminal comprises: a substrate connection section to which the substrate is connected; at least one leg that is held by the insulator; a plate section, a thickness direction of which faces a radial direction, between the leg and the substrate connection section; a section for suppressing stress transmission that has a first terminal and a second terminal, wherein the first terminal is connected to the plate section, and the second terminal is connected to the substrate connection section; and a wire connection section in which a portion projected from the plate section is bent to hold the wire on an inner side.

2. The motor according to claim 1, wherein
the stator core, the insulator, the coil, and a portion of the wire terminal from the leg to the wire connection section are covered with a resin-sealed member.

3. The motor according to claim 2, wherein
an end of the plate section on the side of the section for suppressing stress transmission is exposed from the resin-sealed member.

4. The motor according to claim 1, wherein
the at least one leg comprises: a first leg that is projected, on one side in the circumferential direction of the wire connection section, from the plate section toward the insulator; and a second leg that is projected, on another side in the circumferential direction of the wire connection section, from the plate section toward the insulator, and
the insulator is provided with a first hole into which the first leg is fitted and a second hole into which the second leg is fitted.

5. The motor according to claim 4, wherein
the first hole is a press-fitting hole into which the first leg is fitted, and
the second hole is a guide hole into which the second leg is fitted.

6. The motor according to claim 5, wherein
each of the first leg and the second leg is a square bar in a rectangular cross section,
the first hole is a round hole in a circular cross section, and
the second hole is a square hole in a rectangular cross section.

7. The motor according to claim 5, wherein
the second leg is longer than the first leg.

8. The motor according to claim 5, wherein
the section for suppressing stress transmission is a meandering section that meanders between the plate section and the substrate connection section, and
when seen in a direction of the motor axis, the meandering section does not overlap the first leg.

9. The motor according to claim 8, wherein
when seen in the direction of the motor axis, the section for suppressing stress transmission meanders within a range that overlaps the plate section in the circumferential direction.

10. The motor according to claim 5, wherein
the section for suppressing stress transmission comprises a pin shape that comprises a longer length dimension than the first leg and extends linearly toward the substrate connection section.

11. The motor according to claim 1, wherein
the section for suppressing stress transmission extends from an end of the plate section on the other side in the circumferential direction toward the substrate connection section.

12. The motor according to claim 1, wherein
the wire connection section is electrically connected to the wire by fusing work.

13. The motor according to claim 1, wherein
at least a portion of the leg extends on a same axis as the substrate connection section.

14. The motor according to claim 1, wherein
a length of a portion of the insulator holding the leg is narrower than a width of the coil being wound.

15. The motor according to claim 1, wherein
the section for suppressing stress transmission is an elastic portion that is elastically deformable between the plate section and the substrate connection section.

16. A pump system comprising:
the motor according to claim 1, and further comprising:
an impeller that is rotationally driven by the motor.

17. A motor comprising:
a stator core in which plural salient poles are arranged in a circumferential direction with a motor axis being a center;
an insulator that is held by the stator core;
a coil that is wound around the salient pole via the insulator;
a wire terminal that is held by the insulator and to which a wire extending from the coil is connected; and
a substrate that is connected to the wire terminal, wherein
the wire terminal comprises: a substrate connection section to which the substrate is connected; a leg that is held by the insulator; a plate section, a thickness direction of which faces a radial direction, between the leg and the substrate connection section; an elastic portion that is elastically deformable and has a first terminal and a second terminal, wherein the first terminal is connected to the plate section, and the second terminal is connected to the substrate connection section; and a wire connection section in which a portion projected from the plate section is bent to hold the wire on an inner side.

* * * * *